Feb. 22, 1927.
R. D. ALLEMANG
ANTISKID DEVICE FOR AUTOMOBILES
Filed June 7, 1923
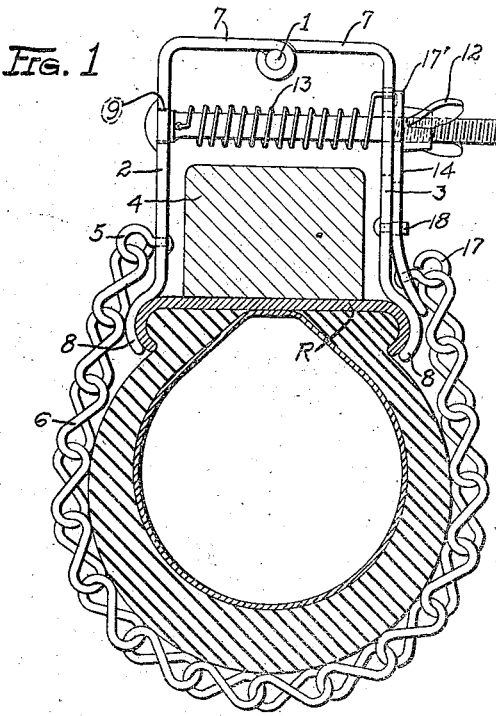
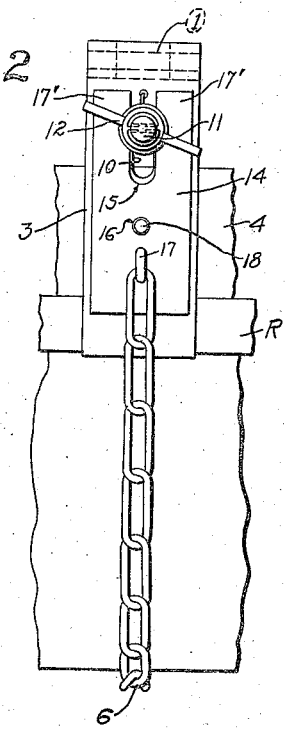
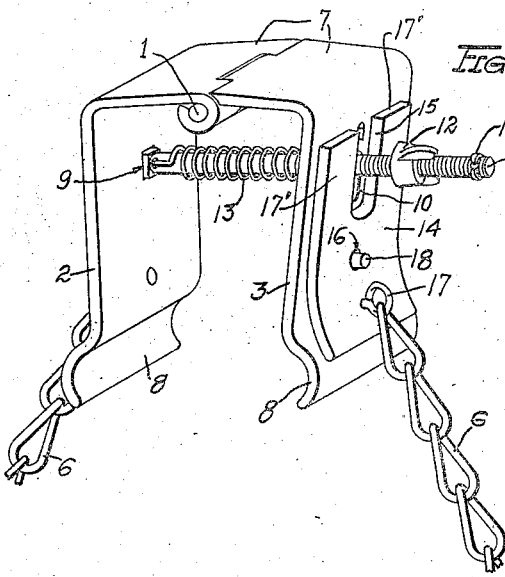
INVENTOR
Raymond D Allemang.

Patented Feb. 22, 1927.

1,618,161

UNITED STATES PATENT OFFICE.

RAYMOND D. ALLEMANG, OF CLAYTON, MISSOURI.

ANTISKID DEVICE FOR AUTOMOBILES.

Application filed June 7, 1923. Serial No. 643,960.

This invention relates to an anti-skidding device particularly designed for use upon motor vehicles employing pneumatic or cushion tires.

An object is to provide an anti-skid device which may be quickly and conveniently attached to or detached from connection with the wheel structure, for use on muddy or sandy roads, or wet or icy pavements or roads.

Another object is to provide a substantially U-shaped hinged structure for attaching or connecting to the rim of a wheel structure so as to facilitate the mounting upon and removal from a tire of flexible tire engaging means, preferably an ordinary chain.

A still further object of the invention is to provide in a substantially U-shaped hingedly joined anti-skidding device a coil spring means whereby, when the U-shaped device is positioned on the rim structure, the sidearms will be drawn into sustaining engagement with rim structure to permit adjusting tread means about the wheel tire and engaging the same with the U-shaped device.

A still further object of the invention is to provide, in a substantially U-shaped hingedly joined anti-skidding device, a locking means engaged to the free terminal of the tread means, whereby when the U-shaped device is positioned on the rim structure and the tread means is adjusted about the wheel tire, the locking means may quickly, easily and securely engage both with the locking sidearm of the U-shaped device and also with the adjusting element employed to clamp the two sidearms of the U-shaped device to the rim structure.

With the foregoing and other objects in view which will appear as the description proceeds, the invention resides in the combination and arrangement of parts and other details of construction hereinafter described and claimed, it being understood that changes in the precise embodiment of the invention herein disclosed, can be made within the scope of what is claimed, without departing from the spirit of the invention.

In the accompanying drawings:

Figure 1 is a transverse section of a fragment of a wheel showing the invention applied thereto.

Figure 2 is a side elevation of a fragment of a wheel, showing the anti-skid device.

Figure 3 is a perspective view showing the means for securing the device to a wheel.

In proceeding in accordance with the present invention, a substantially U-shaped clamp structure operating on a hinge 1 may be employed, the side arms 2 and 3 being disposed approximately parallel to the side edges of the wheel felly 4 to form gripping jaws adapted to engage the opposite sides of the rim structure R without engaging the felly. This U-shaped clamp structure may be positioned at any point desired upon the rim structure between the spokes of the wheel, and it is apparent that as many of the devices, as may be found necessary, may be used.

The outer ends of the respective side arms 2 and 3 are recessed so as to engage over and interlock with the flanges of the tire rim and to approximately conform thereto.

An eye 5, to which a terminal of the tread means 6, preferably a chain, is securely engaged, may be riveted, as shown to side arm 2, or otherwise suitably secured.

The portions of side arms 2 and 3 between the rim engaging extremities 8 and shoulders 7 have oppositely disposed openings 9 and 10, one approximately square, located between eye 5 and the shoulder of side arm 2, the other opening a longitudinal slot in side arm 3 as shown. These openings receive an adjusting element, preferably a bolt 11 which has one of its ends headed, and is approximately square at the headed end to fit the square opening 9, the other end being threaded. The headed end engages side arm 2, and the threaded end extends through side arm 3, as shown. Locking element 12, preferably a wing nut, operates on the screw threads of bolt element 11 thereby forming an adjustable means for clamping outer ends 8 of side arms 2 and 3 against the rim structure R.

A cotter pin 19 extends through the threaded end of bolt 11 to prevent accidental removal of wing nut 12.

One end of a coil spring element 13 extends through the bolt 11 at a point near the head thereof, and the other end of said spring element extends through side arm 3. This spring element 13 yieldably draws sidearms 2 and 3 into sustaining engagement with the rim structure and in operation affords a means whereby the tread means may be conveniently adjusted about the wheel tire and the tread locking means may be conveniently engaged as shown in Fig. 1.

The locking element of my anti-skidding device is in the nature of a plate 14 which may be constructed of sheet metal, and which is shaped to approximately conform to the contour of side arm 3 as shown. This element is designed to have two fingers 17' separated by a longitudinal slot 15, and an aperture 16, preferably circular, as shown. An eye 17, to which the terminal tread means 6 is securely but movably engaged, is attached to element 14, being riveted, as shown, or otherwise suitably secured. In operation the fingers 17' lie at opposite sides of the bolt element 11 as shown.

To side arm 3 is riveted, or otherwise suitably secured, an element 18 preferably a pin as shown. When my entire device is in operation the locking plate element 14 embraces bolt element 11 and is engaged by pin element 18 extending through aperture 16.

In operation it is merely necessary to position side arms 2 and 3 upon the rim structure of a wheel, whereupon spring element 13 yieldably draws the sidearms into sustaining engagement with the rim structure while tread means 6 is being adjusted about the tire, and free terminal locking means 14 is being engaged with side arm 3, bolt element 11 and wing nut 12. When this is accomplished the entire device is locked and ready for operation, and it is apparent that the tread element 6 is engaged with eyes 5 and 17 in such a manner that the tread element is permitted sufficient lost motion to prevent snapping or breaking of the tread means.

I claim:

1. In an anti-skid device, a pair of clamping members adapted to grip the rim of a wheel, a flexible tread member having one of its ends secured to one of said clamping members, and means whereby the other end of said tread member is detachably secured to the other clamping member, said means cooperating with an adjusting element whereby said clamping members are forced into engagement with the rim of the wheel.

2. In an anti-skid device, a pair of gripping jaws adapted to embrace the felloe and rim of an automobile wheel, said jaws having end portions recessed to receive portions of the rim, a bolt extending through said jaws, a nut on said bolt adapted to force said end portions into engagement with the rim, a tread chain secured to one of said gripping jaws, said tread chain having an end portion provided with an attaching plate which is slotted to receive said bolt, the slotted end being interposed between said nut and one of said clamping members, and a lug extending from the last mentioned clamping member and passing through said attaching plate.

3. In an anti-skid device, a pair of gripping jaws adapted to embrace the felloe and rim of an automobile wheel, said jaws having end portions recessed to receive portions of the rim, a bolt extending through said jaws, a nut on said bolt adapted to force said end portions into engagement with the rim, a tread chain secured to one of said gripping jaws, said tread chain having an end portion provided with an attaching plate which is slotted to receive said bolt, the slotted end being interposed between said nut and one of said clamping members, and a lug for retaining said attaching plate in position on said last mentioned clamping member.

4. In an anti-skid device, gripping members adapted to engage opposite sides of an automobile wheel, yielding means cooperating with said gripping members to yieldingly secure them to the wheel, fastening means adapted to rigidly secure said gripping members, and a flexible tread member extending from one of said gripping members to the other.

5. In an anti-skid device, gripping members adapted to engage opposite sides of an automobile wheel, yielding means cooperating with said gripping members to yieldingly secure them to the wheel, fastening means adapted to rigidly secure said gripping members and a flexible tread member extending from one of said gripping members to the other, one end of said flexible tread member being secured by said fastening means.

6. In an anti-skid device the combination with an automobile wheel and a tire, of a substantially U-shaped structure, means for engaging said U-shaped structure to the wheel rim, a tread member and means for securing same to said U-shaped structure, and yieldable means intermediate side-arms of said U-shaped structure whereby said side arms may be drawn into sustaining engagement with the rim to conveniently permit the tread means to be adjusted about the tire.

7. In an anti-skid device the combination with an automobile wheel and a tire, of a substantially U-shaped hinged structure, means for operatively engaging the same to the rim of the wheel, tread means, locking means attached to and forming a free terminal of said tread means, and yieldable means intermediate the side-arms of said U-shaped structure whereby when the latter is positioned in place on the rim, the U-shaped structure will be yieldingly sustained to permit adjustment of tread means about the wheel tire.

8. In an anti-skid device, the combination with an automobile wheel and a tire, of a substantially U-shaped hingedly joined structure the side arms of which have oppositely disposed openings to receive a bolt member, a pin element riveted to one of said side arms, a headed threaded bolt member and a nut member to engage the threaded end of said bolt member, whereby said U-shaped structure may be firmly engaged to the wheel rim, a yieldable spring member engaging both said bolt member and also a locking sidearm of said U-shaped structure whereby the sidearms are drawn into sustaining engagement with the rim, a chain tread member, a locking member attached to one terminal of said tread member, said locking member being apertured to receive said pin and slotted longitudinally at its extremity to receive said bolt member.

9. In an anti-skid device, the combination with an automobile wheel and a tire, of a substantially U-shaped hingedly joined structure the side arms of which have oppositely disposed openings to receive a bolt member, a pin element riveted to one of said locking side arms, a headed threaded bolt member and a nut member to engage the threaded end of said bolt member, whereby the said U-shaped structure may be firmly engaged to the wheel rim, a tread member, a locking member attached to the free terminal of the tread member apertured to engage said pin element and slotted longitudinally at its extremity forming two fingers in spaced relation whereby said locking member may co-engage with a side arm of said U-shaped structure and the bolt and nut members.

10. In an anti-skid device the combination with an automobile wheel and a tire, of a substantially U-shaped hingedly joined structure the sidearms of which have oppositely disposed openings to receive a bolt member, a headed threaded bolt member and a nut member to engage the threaded end of said bolt member, whereby said U-shaped structure may be firmly secured to the wheel rim, a yieldable spring member engaging said bolt member and one of the side arms of said U-shaped structure whereby the side arms of the U structure may be drawn into sustaining engagement with said rim, a tread member, and means to engage the free terminal of the tread member with one of the arms of said U-shaped structure.

In testimony whereof, I affix my signature.

RAYMOND D. ALLEMANG.